United States Patent [19]

Rubio et al.

[11] Patent Number: 4,938,126
[45] Date of Patent: Jul. 3, 1990

[54] TORTILLA PRESS APPARATUS

[76] Inventors: Manuel J. Rubio, 1621 Collings Ave. Apt. 1002, Miami Beach, Fla. 33139; Alberto de la Vega, Amazonas 101, PTE Garza Garcia, N.L., Mexico; Eberhard M. Lobeck, 71 Aiken St., Norwalk, Conn. 06851

[21] Appl. No.: 191,977

[22] Filed: May 9, 1988

[51] Int. Cl.⁵ .............................................. A47J 37/00
[52] U.S. Cl. ........................................ 99/349; 99/353; 99/423; 99/443 C; 100/151; 100/216; 100/178
[58] Field of Search ............... 99/427, 423, 443 C, 99/349, 404, 426, 373, 352, 353; 100/215, 216, 93 R, 154, 153, 151, 152, 177, 178, 226; 425/167, 371; 426/496, 505, 523, 512, 517, 497

[56] References Cited

U.S. PATENT DOCUMENTS

| | | | |
|---|---|---|---|
| 3,646,880 | 3/1972 | Norris | 99/349 |
| 3,867,031 | 2/1975 | Hakanson | 100/178 X |
| 4,153,550 | 5/1979 | Lautrette | 100/177 X |
| 4,197,792 | 4/1980 | Mendoza | 99/353 |
| 4,254,696 | 3/1981 | Ohtake | 99/443 C |
| 4,371,414 | 2/1983 | Ahrweiler | 100/151 X |
| 4,396,566 | 8/1983 | Brinkmann et al. | 425/407 |
| 4,444,094 | 4/1984 | Baker et al. | 99/391 |
| 4,488,480 | 12/1984 | Miller et al. | 99/443 C |
| 4,530,276 | 7/1985 | Miller | 99/393 |
| 4,567,819 | 2/1986 | Adamson | 99/355 |
| 4,683,813 | 8/1987 | Schultz | 99/353 |
| 4,724,755 | 2/1988 | Escamilla | 99/349 |

Primary Examiner—Timothy F. Simone
Attorney, Agent, or Firm—William G. Rhines

[57] ABSTRACT

This invention relates to apparatus and methods for producing formed articles such as tortillas. Embodiments include apparatus comprising a non-sticking, heat tolerant, endless conveyor belt moving at desired constant speeds to position tortilla dough balls between the heated platens of a tortilla press. The press is moveable in the direction of the path of travel of the belt at the same speed as the belt when the platens are in their closed position with the dough balls squeezed between them. Thereafter, the press may be opened sufficiently for the upper platen to disengage the flattened dough and then slowed, stopped and moved counter-directionally to the direction of travel of the belt. At a pre-determined position, the press is again stopped and reversed to cause it to travel again in the direction of travel of the belt. The platens then close on the dough balls when the press has reached the same speed of travel as the belt, repeating the pressing cycle on the group of doughballs next to the last batch of tortillas that was formed by the press.

10 Claims, 8 Drawing Sheets

TORTILLA PRESS APPARATUS

BACKGROUND OF THE INVENTION

In the field of the manufacture of products such as tortillas, efforts have been increasingly directed toward reducing costs and toward increasing the speed of production. Thus, the manufacture of wheat tortillas has evolved over the last few years into several different means and methods of production.

One such means is to die-cut the tortillas. In this means, tortilla dough is mixed in a 300-400 pounds horizontal mixer. The dough is transferred to the feed hopper of a single or double screw extruder which extrudes a 1" thick sheet of dough onto the conveyor belt of a rolling-cutting machine. In the latter, by rolling the dough in a direction which is sideways to the direction of travel of the belt ("cross-rolling"), and lengthwise ("sheeting"), the dough ribbon is gradually reduced to an endless sheet of dough about 30" wide. As the sheet is processed, a subtantial amount of dusting flour is used to prevent sticking of the sheet to the conveyors and the sheeter rolls. A rotating die cuts tortillas in the form of circular cut-outs. The cut-outs are then seperated from the remaining grid of dough, the tortillas exit the machine into an oven where they are cooked, and the grid is returned to the feed hopper of the extruder for reprocessing. Typically, such an apparatus produces 6" and 8" tortillas a the rate of about 1700 dozen per hour or about 1200 dozen per hour for 10" tortillas. This high production rate coupled with a low labor factor produces a low cost product. However, the product itself is not of the best quality because a large portion of the extruded and rolled sheet which forms the grid which, when reprocessed along with the large amount of dusting flour which it bears, inhibits re-mixing, tends to produce a layered sheet, renders the final product substantially inflexible after a few days, produces a product which cracks when bent into forms such as a burrito, and is "sandy" to the taste.

Another means of producing such products is by "hand stretching". Here dough balls are made in apparatus called a (dough) "divider-rounder" which apportions the dough and the forms each portion into a ball. The balls are "proofed" for about 5 minutes; i.e., the dough is allowed to relax after having been overworked in the ball maker. The balls are fed through a "double cross" roller mechanism which rolls the dough in two directions (at a right angle) down to the thickness of the final tortilla product. Since this rarely produces satisfactorily round products, they are stretched into roundness by hand on a table which is heated to stabilize them in shape. Typical installations range in output from 800 dozen per hour for 6" tortillas to 350 dozen per hour for 10" tortillas. The advantages of this method are that the dough is handled more gently and it is proofed prior to sheeting, and less sheeted dough is generated for recycling. The resulting product is more flexible and therefore more satisfactory for producing such products as burritos, although it still bears substantial amounts of dusting flour. The chief disadvantage is a very high labor cost, because virtually every piece produced must be hand formed.

Another process for forming tortillas is the so-called pressing method and apparatus. In this means, dough balls are formed in a divider-rounder, proofed in a proofer cabinet or an automatic proofer, and fed automatically or manually onto a conveyor which carries 6 to 12 dough balls at a time into position between the heated platens of a tortilla press. To attain a reasonable volume of production, a large amount of heat must be imparted to the tortillas by the platens to overcome their inherent tendency to resume their original shape, and thereby to thicken and shrink in size circumferentially. Therefore, the associated conveyor belt must possess a high heat tolerance. For those reasons, and to provide belts with sufficient properties of non-adherence, strength, flexability and durability, conveyor belts in common use consist of a woven fiberglass yarn base with a teflon covering. When a batch of dough balls has been properly positioned between the press platens, the conveyor is stopped and the press is closed on the dough balls for about one second, which squeezes the balls into round, "pancake" shaped tortillas that are then transferred into an oven for baking. Since the heating of the tortillas during pressing to stabilize them in shape and size also melts some of the shortening in the dough, dusting flour is not reguired and the result is a superior, better tasting product. However, having to start and stop the conveyor each time a new group of dough balls is presented by it to the press severely limits the output of such apparatus to the range of from about 350 to 500 dozen 6"-8" tortillas per hour.

These speed cycles limit production due to the time consumed while the belt is stopped. They also introduce other difficulties which prevent reaching desired production speeds and quality levels. The composition of the belt is dictated by the physical and thermal environment to which it is exposed, and the requirement that it be sufficiently non-adhering for the end product to be easily removed from it. One of its characteristics of acceptable materials is that they are inherently slick, particularly when the feature of non-adherence is adequately accommodated. This seriously limits the rate at which there can be acceleration and deceleration of the belt during each of its stop-start cycles, so that the volume of production is further seriously limited; otherwise the inertia of the dough during speed changes causes it to slip out of position, particularly if it is in the form of a ball. One approach to reducing incidence of this is to try to increase the ability of dough to adhere to the top surface of the belt by having operators position the balls on the belt and manually press down on each of them, but that expedient is expensive and time consuming. If such shifts occur, they may cause the finished tortillas to overlay each other, or to be totally outside or only partially within the press area. That can cause the tortillas which are pressed to become sufficiently out of round, irregularly or incompletely pressed, and/or of non-uniform thickness to render them not useful or acceptable commercially and therefore lost production. Those results also can occur when the opposition of the dough balls to the closure of the platens during the pressing operation is not substantially uniform throughout the opposing surfaces of the platens. That can happen when dough shifts or where there are voids in the pattern of dough units exposed to the press. The platens will then tend to come together out of parallal planar relationship to each other, causing uneven flattening within and among the tortillas in that batch. It may also introduce potentially damaging lateral moments of force on the piston rod of the hydraulic cylinder mechanism that is typically used to actuate the upper platen of the press in its upward and downward traverses. Although the possibility of these effects will be reduced substantially by the constant feed feature of the present invention, it is also desired to provide other means to avoid them totally and in any event. That is because even when inertial displacement of the dough balls which the present invention is designed to avoid does not take place, there still may be irregularities in the geometry of their placement. For example, the dough ball dispenser may fail to place a ball where one should have been positioned or, in a manual operation, an operator may miss placement of one or more balls.

In addition, such prior art processes and apparatus, particularly when there are voids in the distribution and/or mass of tortillas being cooked, may cause difficulties in controlling the amount of heat in the ovens in which they are subsequently cooked and the extent to which products passing through the oven are cooked, and may detract from the efficient use of fuel. The intermittant loading of the oven which results when successive batches of dough are introduced into the ovens causes variations in the amount of heat being extracted from the oven by the cooking process and in the temperature in the oven over any given span of time. This may cause some of the tortillas to be undercooked if they are placed in the oven immediately following a large mass of dough, or overcooked and even burned (particularly around the edges) if they are introduced into the oven after it has been unoccupied for a while. To avoid such temperature "ranging", the amount of fuel used in the oven may be varied, but this results in inefficient fuel utilization, as also does overheating.

Yet another problem with prior art apparatus of this type is that the belts used with them tend to become fouled with bits of dough and other debris. When exposed to the heating effects of the platens, such deposits can become carbonized to form hot spots where there is consequent rapid deterioration of the belt and sometimes burning of holes in it, ultimately rendering it unusable.

Thus, some of the major disadvantages of the prior art apparatus and methods in this field are low productivity per unit time, high manpower requirements, sanitary difficulties where the constituent dough is manually handled, poor product consistency, poor product quality, poor fuel efficiency, high scrap rates, and intermittent production and oven loading.

Accordingly, it is an object of this invention to provide means for the continuous automated production of objects made from dough that are stabilized in a pancake-like shape.

Another object of this invention is to provide means which will achieve the foregoing object with increased production speeds, reduced scrap, and improved energy efficiency.

Still another object of this invention is to provide means to achieve the foregoing objects with improved life of the constituent elements of the apparatus used.

Yet another object of this invention is to provide means to achieve the foregoing objects which may be integrated with other known per se means for producing products such as tortillas.

STATEMENT OF INVENTION

Embodiments of the present invention include press apparatus with heated platens that have opposing surfaces which are in parallel planar relationship to each other and are selectively positionable into and out of proximity to each other to press dough units positioned between them on a steadily and continuously moving, heat-tolerant conveyor belt. The press apparatus may be moved in the direction of travel of the belt at the same speed as the belt while its platens press the dough units. After the platens have opened been to cease pressing, the press apparatus may be decelerated and stopped, moved counter-directionally to the belt to a predetermined location. It may then be reversed in direction while it accelerates to the speed of the belt, following which the platens close on a batch of dough units that have not been pressed and are next adjacent to the batch previously pressed. Other embodiments include tortilla press forming apparatus wherein vacuum means are included to remove debris from the surfaces of the belt, and/or wherein platen flange means are included to ensure that the platens remain in parallel planar relationship to each other during pressing regardless of the uniformity of the distribution of dough units between the platens, and methods of carrying out the steps of this invention.

DESCRIPTION OF DRAWINGS

This invention may be understood from the following description and claims, and from the accompanying drawings in which

DESCRIPTION OF PREFERED EMBODIMENTS

Figure 1:
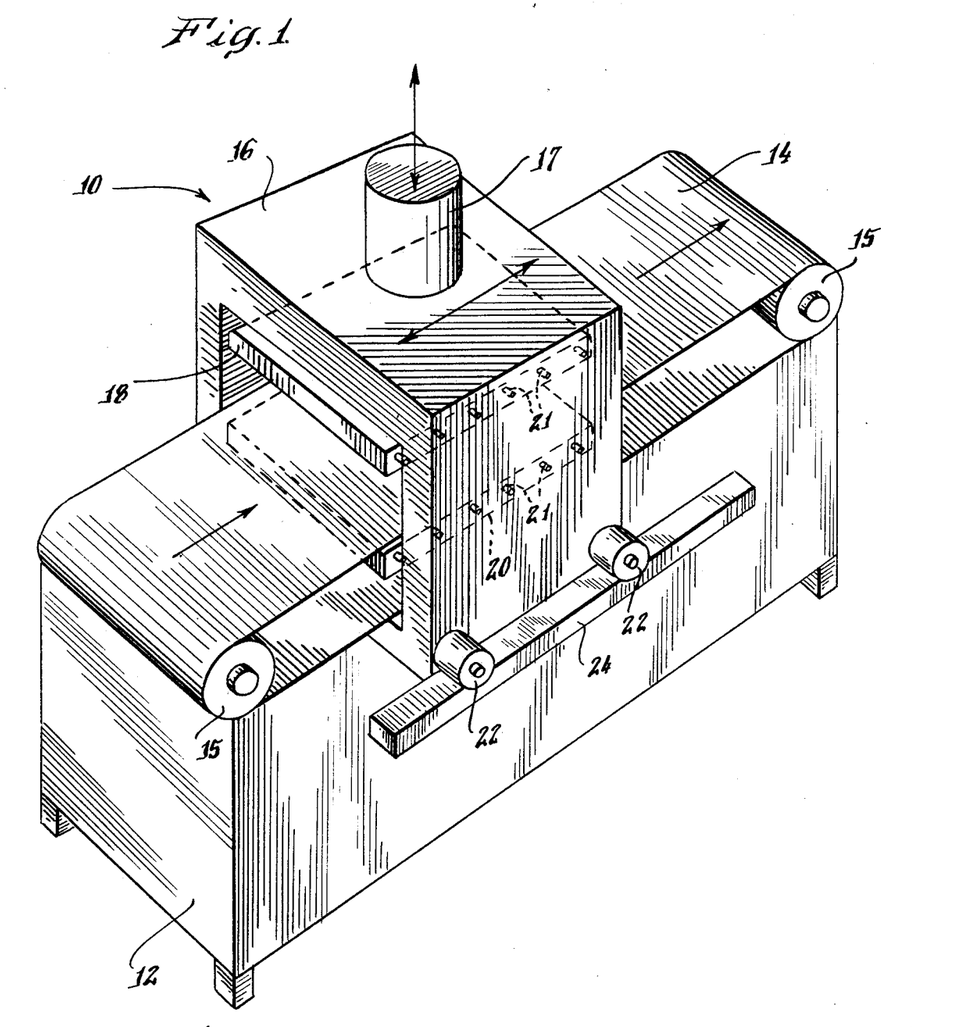
FIG. 1 is a perspective view of an embodiment of this invention.

FIG. 1 illustrates a moving press apparatus 10 which embodies the present invention. It includes a support frame 12 upon which are moveably affixed belt rolls 15 about which is positioned an endless conveyer belt 14 made from teflon coated fiberglass fabric or other known per se heat-tolerant, flexible, durable material. The belt may be driven at selected, controlled, constant speeds by known per se means, (not, shown), such a D.C. electric drive motor and speed regulator or controller. The frame 12 includes front and back rail means 24 along which may move wheels 22 that are moveably affixed to the bottom of a press frame 16. Also affixed to the press frame 16 is a lower platen 20 and, via affixation to the piston rod of a hydraulic actuating mechanism 17 by which it may be moved upward and downward, an upper platen 18. Although it is within the contemplation of this invention that the lower platen also or in the alternative may be moveable upward and downward by greater or lesser amounts, that usually is not neseccary or desirable, as will be apparent from the description which follows. Both of the platens are heatable by means of electrically energized calrods 21 or other known per se heating devices. The wheels 22 permit the press frame 16 to be moved in the same direction as and counter-directionally to the direction of travel of the belt 14. It should be noted in particular that the belt 14 is so positioned that its upper run, upon which are positioned the dough units to be processed, is between the opposing, parallel planar faces of the platens 18,20. The return run of the belt 14 passes under the lower platen 20. As will be clear from the discussion which follows, given this positioning of the belt 14 vis-a-vis the platens 18,20, the need to replace conveyor belts frequently is accomodated by having portions of the front members of the press frame 16 and the front supports for the drive rolls 15 removeable, and the rolls 15 and the platen supporting portions of the frame 16 capable of being cantilevered off the back of the press frame 16. By these means, a used belt 14 may be removed and replaced without extensive dis-assembly of the press support structure.

Figure 2:
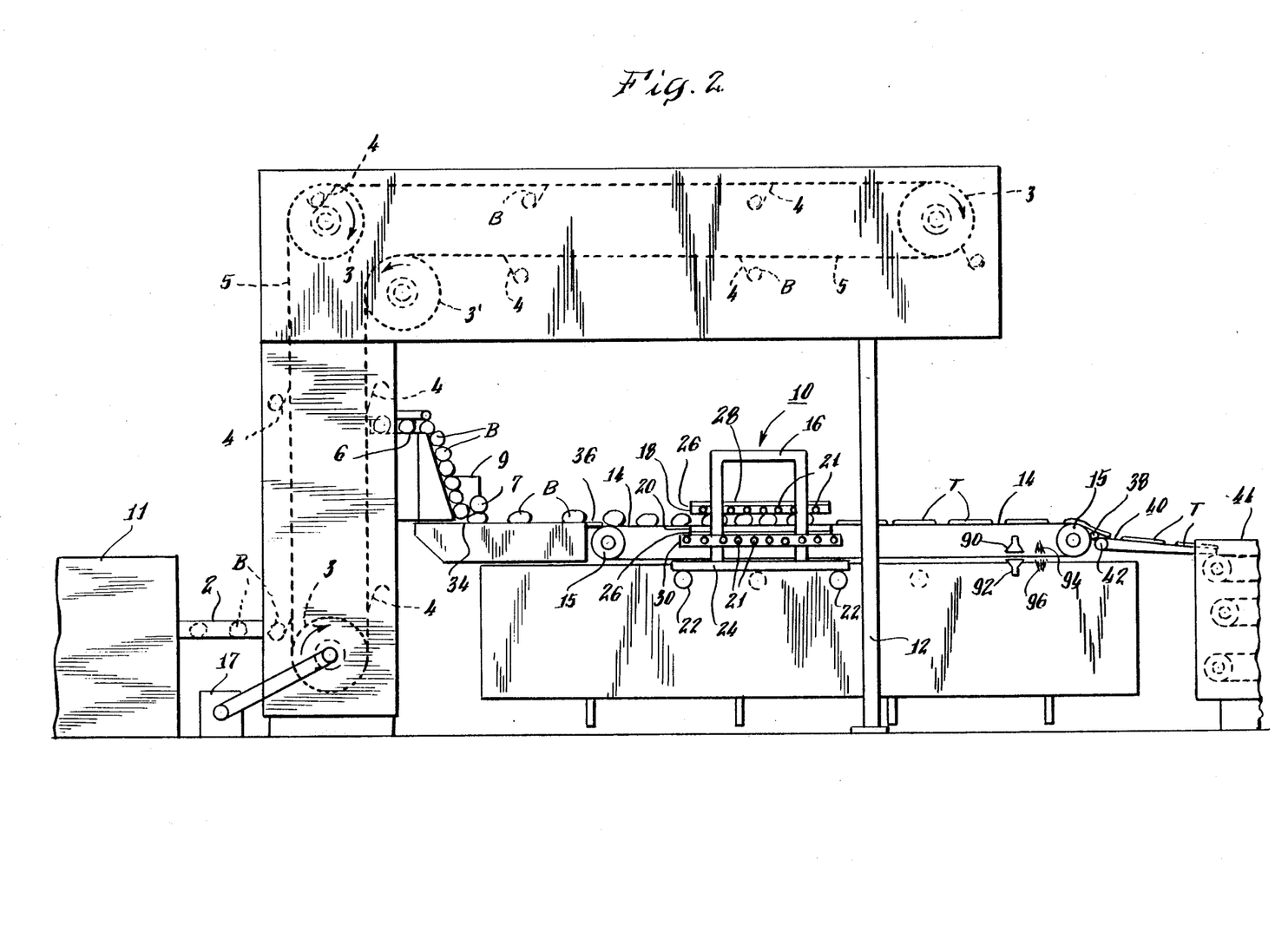
FIG. 2 is a side elevation view of an embodiment of this invention in situ with other apparatus.

FIG. 2 illustrates an embodiment of this invention of the type shown in FIG. 1 in the context of the collateral equipment with which it is normally associated. Included is a known per se dough ball feeder 2 extending from a known per se divider-rounder 11, by means of which dough balls are continuously fed to ball carrier trays 4 which are swingingly affixed (in the manner of the seats on a ferris wheel) from cross-rods (not shown) between the chains 5 of a proofer 1, or other known per se means for carrying such balls through a proofer. The trays typically hold 6 or more doughballs each in side-by-side relationship. The purpose of the proofer is to provide a short period of time (e.g., 5 minutes) during which the dough can "relax" so as to stabilize after having been worked in the divider-rounder. The balls B are carried along around the sprocket wheels 3 driven by motor 17 to the point where each carrier 4 is inverted to cause the balls it is carrying to fall into the feed pipe 6 of an automatic dispenser 9. There the balls in each group are shunted into parallel rows of balls (typically 3 abreast). Subsequently, groups of balls (3 in the case being discussed) are simultaneously released and pass between conveyor belt 34 and the roll 7 or through a pair of opposing flattening belts (not shown) or other similar means, by which the balls are slightly flattened to cause them to adhere slightly to the feed belt 34 and to be less inclined to roll as they might if they were still fully round. So positioned, they form rows and columns of evenly spaced dough units on the feed belt 34 in successive, evenly spaced groups that are each about equal in dimension down the length of the belt 34 to the machine-direction dimension of the upper platen pressing surface. The egress end of the feed belt 34 reverses direction about a shaft 36, and there delivers successive, evenly-spaced rows of dough balls to the press conveyor belt 14. The press conveyer belt 14 moves at a selected, steady rate of speed, carrying along groups or "sets" of dough balls (usually 3 rows of 3 each) to the region of the press 10 which moves back and forth in the direction of travel of the press belt 14, with vertical movement to the upper press platen 18 downward and upward. These movements are coordinated by means hereinafter described so that when the press platens are closed, the press is moving along at the same rate of speed and in the same direction as the belt, following which the platens open, the press reverses twice to return it to an original starting position and to start it moving again in the direction of travel of the belt, and the pressing cycle begins again on the set of balls next adjacent the set just previously pressed. At the discharge end of the press conveyor belt 14 may be mounted a known per se tortilla remover 38, which is in the form of a shaft which rotates counter-directionally to the rolls 15 of the press. It has a brush-like cover which serves to lift the finished tortillas off the belt 14 and to transport them over to the belt 40 by which they are carried into an associated oven 44 to be finally cooked.

Previously, there has been reference to a problem with respect to the heat resistant conveyor belts which are made fron teflon coated fiberglass fabric and are comparatively expensive. As noted, they are susceptable to damage from particles of dough and other debris which sticks to their surfaces becoming so hot as to render the belt unusable prematurely. Accordingly, it is within the contemplation of this invention to include vacuum devices 90,92, preceeded by brushes 94,96, on the inside and on the outside respectively of the return run of the press belt 14. By this means, both the upper and lower surfaces of the belt 14 may be cleaned continuously while in use, thus extending the life of the belts and reducing materially the costs of installing, maintaining, and replacing them.

Figure 3:
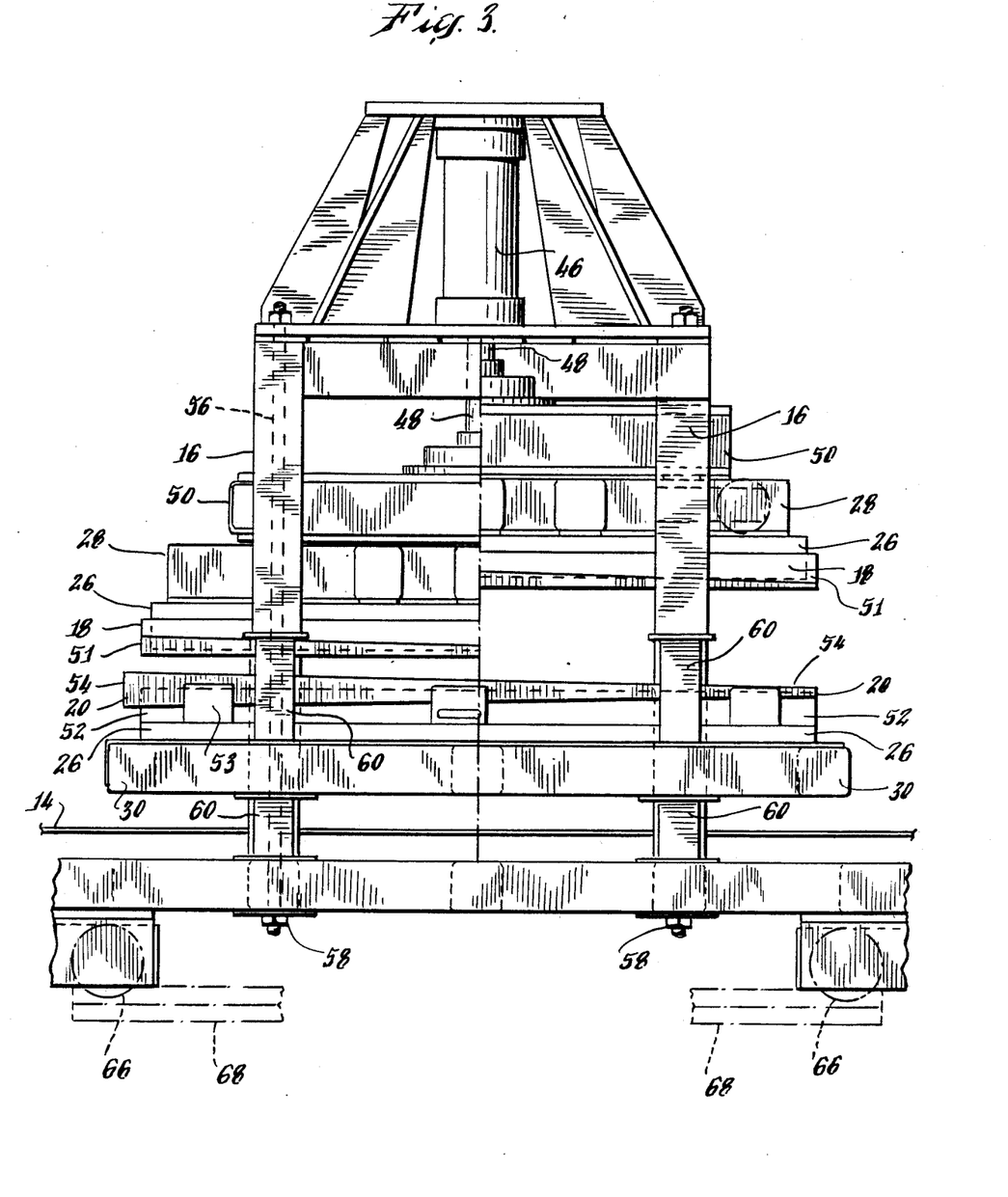
FIG. 3 is an elevation view of a portion of one side of the embodiment of this invention shown in FIG. 2.

FIG. 3 illustrates in greater detail a portion of the front of the embodiment of this invention shown in FIG. 2; i.e., the side facing toward the viewer. The left side of the elevation shown in FIG. 3 shows the upper press platen 18 in its normal open position, while the right side shows it as it may be opened even further for purposes of cleaning, maintenance, etc. FIG. 3 shows the frame 16 of the press, in the form of vertical posts having segments 60 which may be removed to facilitate replacement of conveyor belts as previously described; all of which are held in place by a long bolt 56 with a retaining nut 58. The hydraulic actuator 46, to the piston 48 of which the upper platen 18 is affixed and by which the platen 18 may be moved up and down, is affixed to the top of the press frame 16. Between the piston 48 and the top platen 18 are support members 50, 28 which provide strength and distribute forces applied by the piston 48 uniformly to the platen 18. The platen 18 is seperated from the support member 28 by a layer of insulation 26, which keeps the support member from acting as a heat sink by drawing heat away from the platen 18 into the support 28. Similarly, and for the same reason, the lower platen 20, which is held in place by support member 30, is also separated from it by a layer of insulation 26.

Along the front and back edges of the lower platen 20, and extending above the level of its upper, flat surface, and along the front and back edges of the upper platen 18 and extending below its lower, flat surface, are wedge-shaped shim members 51,52 respectively. Atop the lower shim member 52 is slideably affixed a reverse-oriented wedge-shaped shim member 54 by means of brackets 53. The purpose of each of these shim members is to provide means by which the platens 18,20 may be prevented from moving closer to each other than a predetermined uniform distance throughout their opposing surfaces and to unify the forces acting on the lower platen 20 by the upper platen 18. The "ramp" effect of the opposing, inclined-plane surfaces of these shims makes it possible to adjust the distance between the top platen and the bottom platen when they are in the closed position with assurance that that distance will be maintained uniform throughout the length and breadth of the platens. By this means, the thickness to which tortillas may be pressed between them may be accurately controlled and regulated. In addition, if there is a discontinuity in the geometric distribution of dough units between the platens, as by one or more having been omitted or having shifted in placement, it is assured that the platens will be positioned parallel to each other at a predetermined desired distance apart throughout. Therefore, there will not be any discontinuity in the thickness of individual tortillas or between the tortillas in a given group, and damage to the machine, as by the introduction of lateral force moments to the piston rod 48, will be avoided. While a similar result may be achieved through other means, such as posts at each corner of the platens, the shim structures as described have the advantage of distributing forces to a greater extent along the surfaces of the platens.

Figure 4:
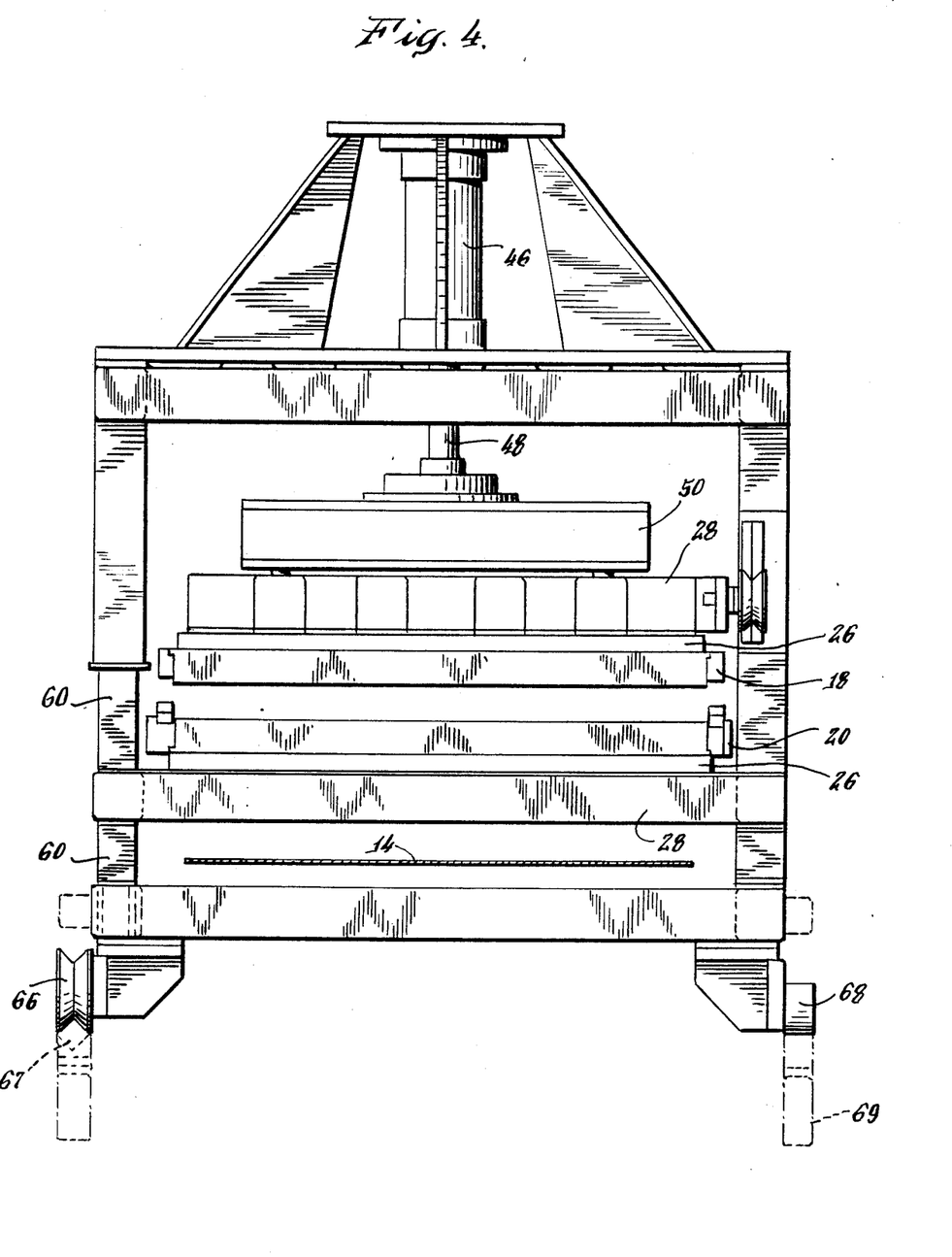
FIG. 4 is an elevation view of a portion of one end of the embodiment of the invention shown in FIGS. 2 and 3.

FIG. 4 is an elevation view of a portion of the end of the press which would face to the right in FIG. 2; i.e., toward the direction to which the associated belt 14 is traveling. From FIG. 4, it will be clear that unlike the vertical support members of the press frame 16 which face toward the front of the press and are shown on the lefthand side of FIG. 4, those which face to the rear of the press and are shown on the righthand side of FIG. 4 are not segmented or otherwise adapted for removal of selected parts to accomodate belt replacement. This is because it is this back portion of the frame which supplies cantilever support for the belt rolls, the lower platen 20, and the upper part of the press frame 16 (which supports the hydraulic actuator and upper platen structures) during such belt changes. Another difference shown in FIG. 4 is between the front wheels 66 and the rear wheels 68, and their respective support rails 67,69. The wheels 66 are grooved so as to accept an inverted length of angle-iron as a support rail 67 and thus ensure that the press will be able to be moved back and forth without getting out of alignment with the belt 14 and the rest of the apparatus. However, comparable structures are not necessary as to the back rail support 69 for the wheels 68, and indeed are preferably avoided so as to accomodate minor lateral shifts in the press frame due to small mis-alignments of the support rails.

Figure 5:
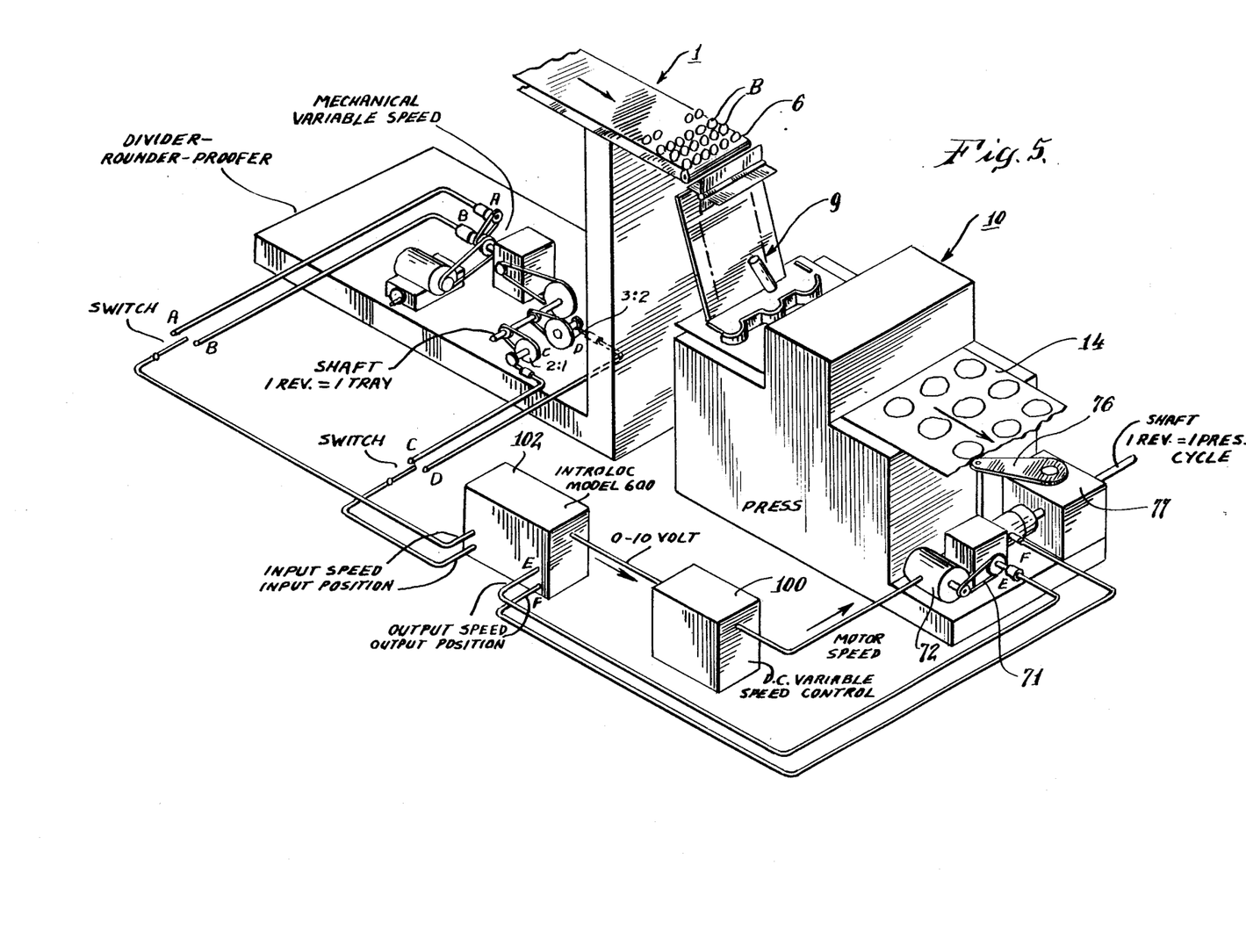
FIG. 5 is a schematic representation of various components of the embodiments of this invention.

FIG. 5 is a schematic representation of means by which the various constituent parts of the apparatus embodying this invention may be regulated, coordinated, synchronized and controlled. By means of this apparatus, it is possible to have a divider-rounder-proofer output of 240 6" or 8" balls per minute (or 96 10" balls per minute) coordinated with a press running at 20 cycles per minute (16 with 10" balls). The "master", independantly variable reference with which all other among the interrelated machine component movements are coordinated is the speed of the divider-rounder-proofer, which is regulated by a mechanical (variable sheave) speed adjuster on the output side of a drive motor 101. The press drive mechanism is a D.C. motor 72 (to make it readily speed adjustable) with a variable speed control 100 which is, in turn, controlled by the 0-10 volt signal of a digital speed control 102, such as an Introloc Model 600, that has the capability to control both speed and position (phasing). The speed of the press conveyor belt, the position of the press platens with respect to each other and the timing of their opening and closing, and the timing of the opening and closing of the gate that releases dough balls from the dispenser, in turn, are all "mechanically" (i.e., truly mechanically or pneumatically) "slaved" to the press drive to control the timing of their respective actions and positions inter se as well as with respect to those of the press. To perform its function, the control 102 requires the input of speed and position (phase) signals from a primary reference location. It may also be desirable to be able to switch the input signals coming from that reference so as to produce different inputs to accomodate changes in the ratio of machine speeds (as where 10" balls rather than 6" or 8" balls are being used and few balls pass through the proofer, and the ratios of outputs change correspondingly as noted above). FIG. 5 shows two such input speed sensors A,B, and two position sensors C,D. However, it is within the contemplation of this invention that the digital speed control unit may be designed so as to accommodate such ratio changes with a single set of speed and phase sensors rather than the dual sensor sets and switching components that have been shown in FIG. 5. The speed and position (phasing) sensors A,B and C,D respectively are operated by the last wheel 3' over which the chains 5 of the proofer conveyor pass before arriving at the the position where the balls being carried by it are dumped into the dispenser 9. The reason for using this as the primary or master reference is that it is the last "reading" opportunity before the various actions begin which have to be interrelated and correlated with the output of the proofer, so taking the control reading at this point limits the opportunity for variables to intervene. A preferred way to get reading data at this point is mechanically through use of a cam or other take-off device which inherently produces angular displacement data (e.g., 360 degrees per revolution) as well as speed data. In operation, the divider-rounder-proofer drive is started first, and then the press drive. he speed sensor first senses the speed of the proofer at the primary sensing point. Against that reference, the control adjusts the press speed so that the number of dough balls being carried by the conveyor belt through the press per unit time is equal to the dough ball output of the divider-rounder-proofer. Thus, for example, if the proofer is delivering trays of 6 dough balls each to the dispenser per unit time and the press conveyor belt is transporting balls at the rate of 12 per unit time, the linear speed of the press conveyor belt will be one-half that of the conveyor chains in the proofer. When the two speeds have been stabilized to produce equal ball output rates, the sensor control "looks at" the position (phase) signals being received from the operating phase sensor at the primary reference point in the proofer, which are typically at the rate of one pulse per cycle, and causes an adjustment in the speed of the press drive so that the latter becomes synchronized in phase with the proofer phase reference signal. While the drives are running, the input signals are sampled periodically (e.g., every 4 seconds), and adjustments in press speed are made to preserve the timing and phase synchronizations. As previously noted, the other inter-related apparatus movements, such the open-close cycles of the press platens, the press positioning mechanism, and the dispenser control gate, are interlinked mechanically with the press drive, so effectively, the movements of all of these are coordinated and synchronized both in speed and in phase with each other and the press, and with the output of the proofer.

Figure 6:
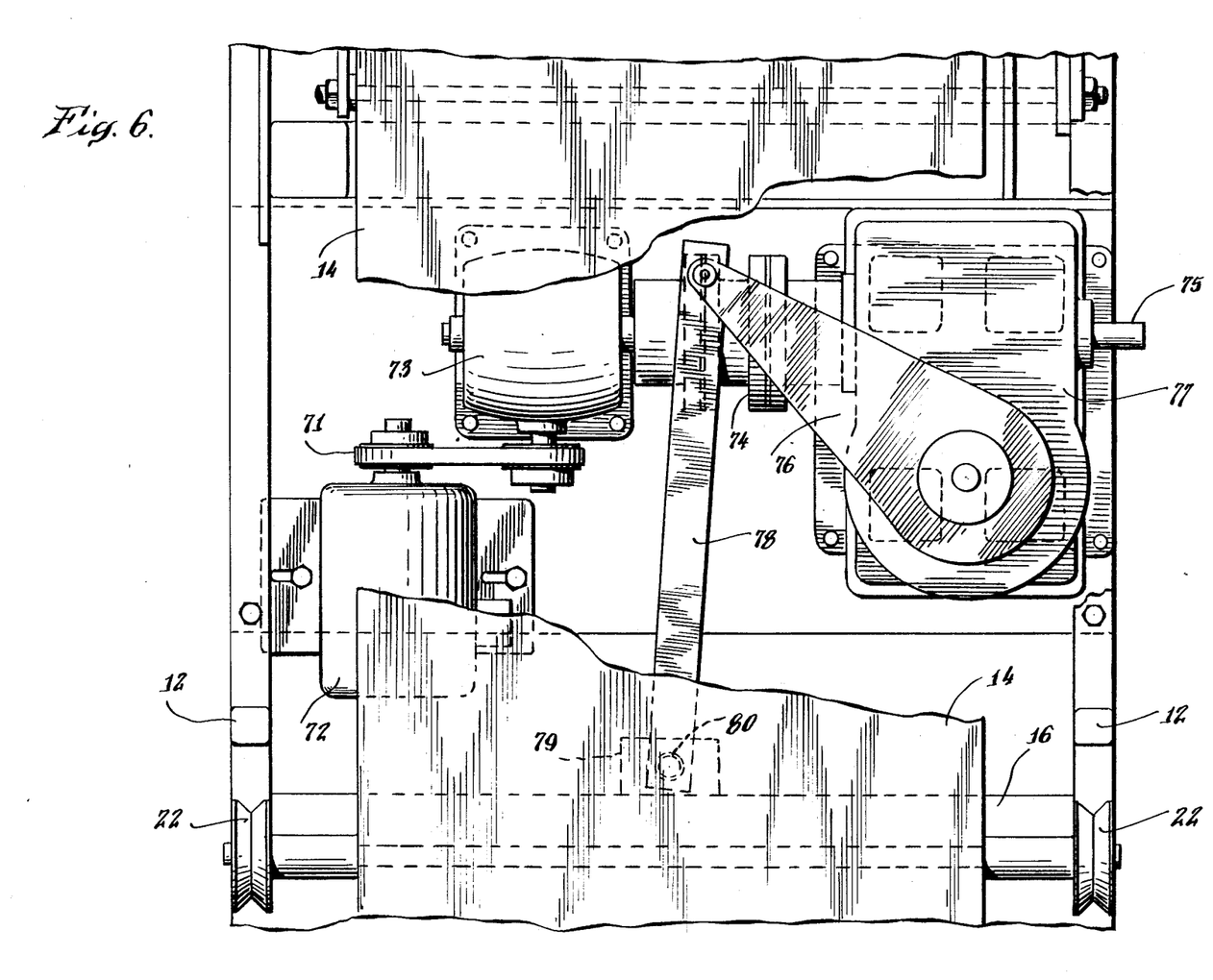
FIG. 6 is a plan view of a portion of the embodiment of this invention shown in FIG. 2.

FIG. 6 illustrates in plan view some of the structural details of the mechanism which causes the press to move forward (i.e., in the direction of travel of the belt 14) and backward as desired. As such it includes a drive motor 72, which is connected via a belt drive 71 to a reduction gear device 73, the output of which is connected to an oscillator drive 77. The oscillator drive 77, such as a "CAMCO" unit manufactured by the Commercial Cam Division of Emerson Electric Company of Wheeling, Ill., not only provides the mechanism by which the rotation of the output shaft of the reducer 73 is converted to the backward-forward motion of the arm 76, but it also provides a rotating shaft 75 which serves as a power take-off to drive the press conveyor belt, the platen open-close mechanism, and the dispenser gate and the other coordinated mechanisms.

Figure 7:
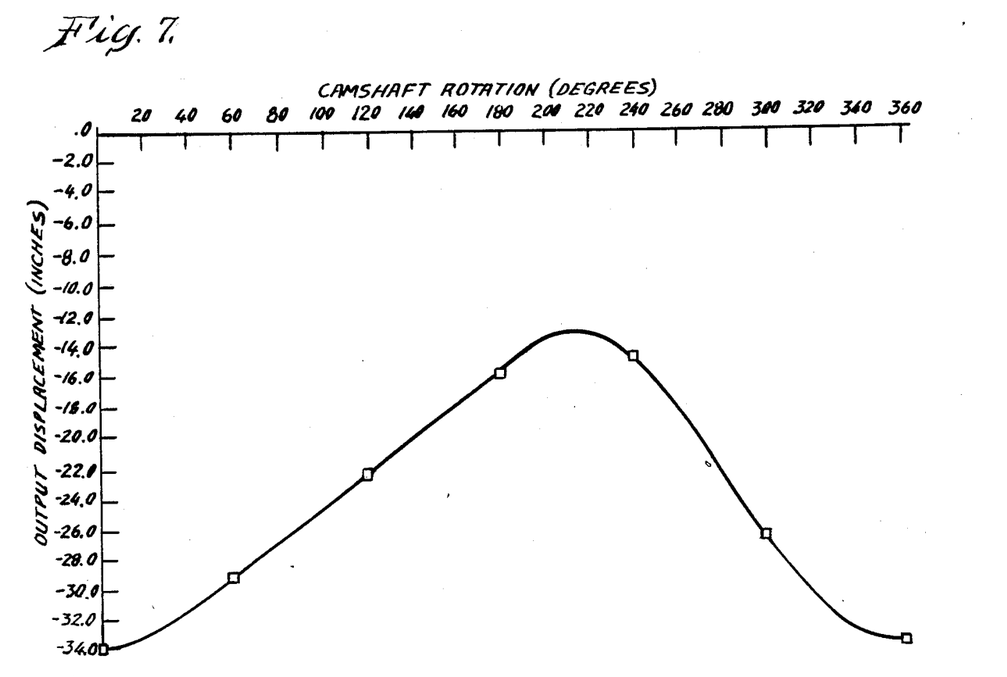
FIG. 7 is a graphic depiction of the operation of parts of the embodiment of this invention shown in FIGS. 2 through 6.

FIG. 7 depicts graphically the interrelationship between the angular disposition (phase) of the primary reference cam previously referred to, and the linear displacement of the rod 78 shown in FIG. 6 along the travel path of the belt 14. The portion of the curve illustrated between the points A and B represents the period in each cycle when the press is being moved in the same direction and rate of travel of the belt 14, with the platens of the press in the closed position. "A" represents the point by which impingement of the upper platen on the dough units first occurs, and "B" represents the point not earlier than which the upper platen moves upward and out of engagement with the newly formed tortillas. The traverse time from A to B represents the period during which heating of the dough units occurs in order to stabilize them in their pressed configuration, as previously described. The portion of the graph from point B to the peak of the curve represents the time necessary to slow down the forward movement of the press until it stops. The rest of the curve to the bottom-most point at the right represents the time necessary to return the press to its original starting position. The portion of the slope preceding the point "A" represents the time necessary to get the press frame started again in the direction of movement of the belt and up to a speed equal to that of the belt by the time by which platen closure occurs again at point A.

Figure 8:
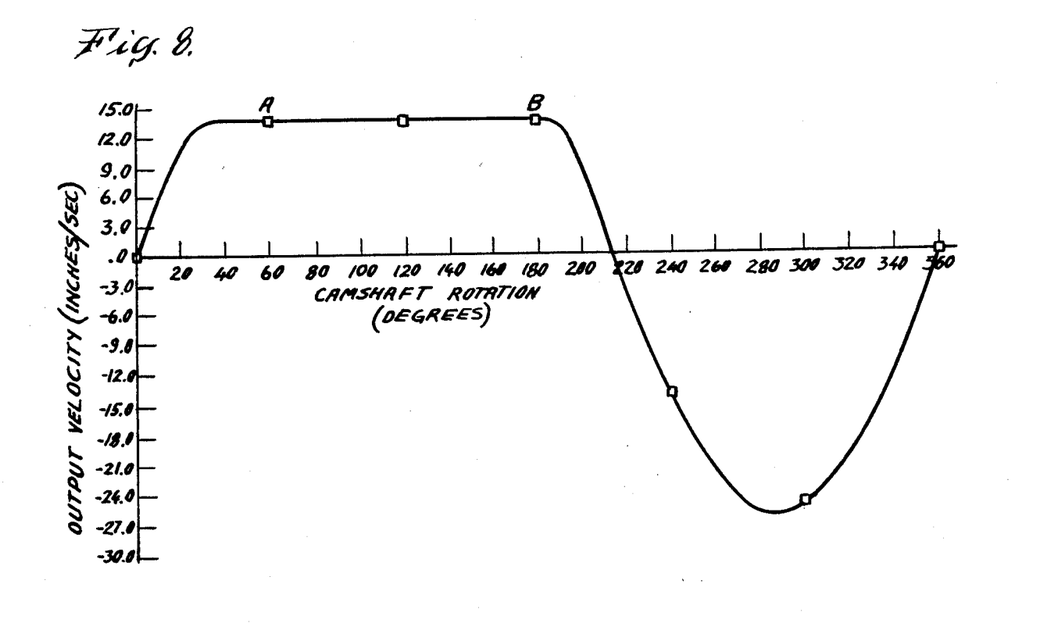
FIG. 8 is another graphic depiction of the operation of a part of the embodiment of this invention shown in FIGS. 2 through 6.

Similarly, FIG. 8 presents graphically press movement velocity as a function of the degree of rotation of the reference cam. The portion of the graph line from point B until it starts downward represents the amount of camshaft rotation (which, of course, is time related according to the speed of the cam) between when the platens open and the linear movement of the press in the direction of travel of the belt begins to reduce. The slope reversal following point B to the bottom of the curve represents the degree of cam rotation, and therefore the time period, for the return of the press to its starting position. That is followed by an upward slope representing the period of cam rotation and (therefore) time lapse for the re-starting of the press in motion in the same direction of travel as the belt until it reaches the same speed (represented by the beginning of the flat, top portion of the curve), following which the platens close by point A and remain closed until opened not earlier than point B.

Figure 9:
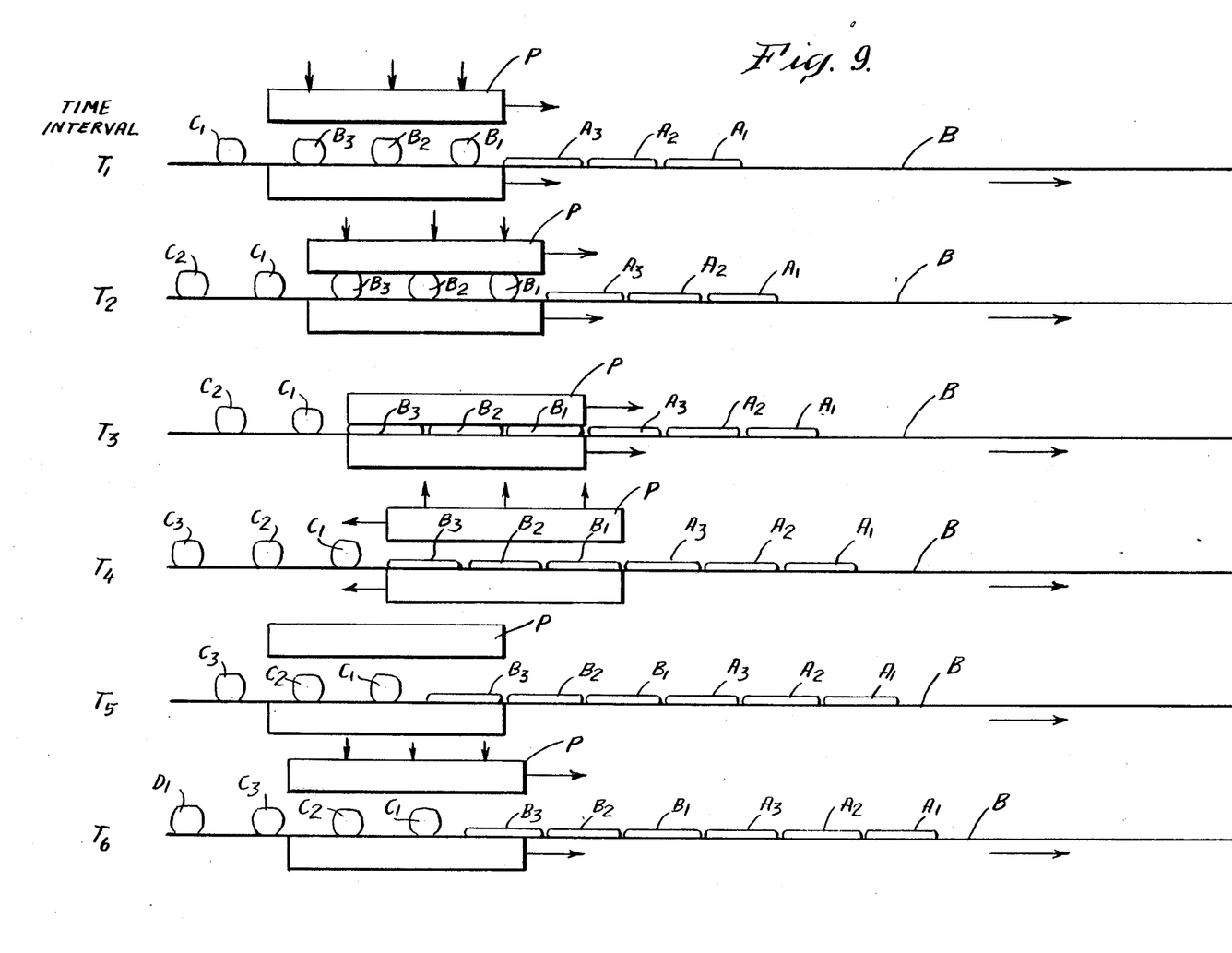
FIG. 9 illustrates successive steps in carrying out this invention.

FIG. 9 depicts the successive steps in the operation of the press and belt apparatus previously described, in successive time increments "T1" through "T6". At T1, the press P is moving forward (i.e., in the direction of travel of the conveyor belt B) and is closing upon dough balls B1, B2, B3 which have been newly introduced into the region between the platens by the constant velocity belt B. (The next previously pressed batch of dough units A1, A2, A3 are adjacent to the new batch B1, B2, B3, and displaced therefrom in the direction of travel of the belt B). At T2, the simultaneous pressing of units A1, A2, A3, has commenced with the press P and the belt B now moving together at the same speed. At T3, heated pressing is complete, with the press P and the belt B still moving forward at the same speed. At T4 the upper platen has cleared the newly formed tortillas B1, B2, B3 and has started to move back to its starting position. At T5 the press P has returned to its starting position while the continued motion of the belt B has introduced a new set of dough balls C1, C2, C3 nearly into pressing position between the platens. A positional disparity of the press platens and dough balls when they are in final pressing position is shown in T5 and as the press P resumes movement in the direction of motion of the belt B as shown at T6. That disparity accommodates the further net migration of the belt B with respect to the press P during the time the press is getting up to the required linear speed in order to get the new group of dough balls C1, C2, C3 into proper pressing alignment with respect to the press platens before closure of the platens begins as at T1, the next in the repetitive steps of the process.

From the foregoing discussion, it will be clear that through practice of the present invention, it is possible to increase materially the volume, quality, and profitability of products such as wheat tortillas. It will also be clear that the embodiments of this invention that have been disclosed and discussed herein are by way of illustration and not of limitation, and that a wide variety of embodiments may be made without departing from the spirit or scope of this invention:

I claim:

1. Press apparatus for pressing dough units into flat, pancake-like shapes, comprising,
   a press having upper and lower platens between which is positioned a dough unit carrying conveyor belt traveling at a predetermined velocity, wherein
      each of said platens has a substantially flat planar pressing surface and said surface of each is in substantially parallel, opposing, facing relationship to that of the other,
      at least the upper of said platens is moveable vertically to position said surfaces of said platens in close, spaced-apart juxtaposition at a first predetermined distance from each other while said press moves in the same direction and at the same speed as said belt, and wherein, within a period of time that is sufficient for unpressed doughballs being transported by said belt to become positioned between said pressing surfaces of said platens,
      the upper of said platens then moves upward until its said surface is spaced apart from said surface of said lower platen by a second predetermined distance while said press reduces its speed progressively from that of said belt until said press stops, and thereafter moves counterdirectionally to said belt to a predetermined point, and then again moves in the same direction as said belt at an increasing speed until it has attained substantially the same speed as the belt when said upper platen moves downward until its said surface reaches said first predetermined distance from said surface of the lower platen.

2. The apparatus described in claim 1 wherein at least one of said platens is heated.

3. The apparatus described in claim 1 wherein said conveyor belt that is positioned between said platens, is moving at a substantially constant, pre-established rate of speed and is a component of associated apparatus.

4. The apparatus described in claim 3 wherein both of said platens are heated and said conveyor belt is made from heat-tolerant material.

5. The apparatus described in claim 4 including
   supply means for supplying proofed dough units to the top surface of said conveyor belt in substantially uniformly spaced groups, and
   coordinating means by which said belt and said press are speed and phase coordinated with said supply means to cause
   said surfaces of said press platens to press a group of dough units positioned atop said belt as said press moves in the direction of travel of said belt at the same speed and then to move out of pressing proximity with each other
   said press to then stop, reverse direction and stop again at a pre-determined location, and to move again in the direction of said belt at the same speed as the belt, and
   said surfaces of said platens then to come into pressing proximity to each other on the group of dough units adjacent the group next previously pressed by them.

6. The apparatus described in claim 5 wherein said coordinating means includes electronic means to equalize the number of dough units coming from said proofer with the the number of dough units being transported by said belt.

7. Apparatus for producing tortillas comprising
   dough-divider means which discharges into
   proofer means which discharges into
   dispenser means which discharges geometrically placed groups of dough units onto
   an endless, moveable conveyor belt having an upper run that passes between heated upper and lower platens of a press which is moveable forward and backward along the path of travel of the belt, said upper platen being vertically moveable into and out of cooperative pressing relationship with said lower platen, which belt discharges onto the endless, moveable conveyor belt of an oven,
   proofer drive means to drive said proofer,
   press drive means to drive said belt at pre-determined speeds, said upper platen upward and downward, said press forward and backward, and said dispenser simultaneously and via mechanical interlink means by which actuation of them is speed and phase coordinated as between each other, and
   electronic interlink means by which the speed and phase of said press drive means are coordinated with those of said proofer drive means,
   wherein said press moves at the same speed and in the same direction as said belt while said platens are in the closed, pressing position, the platens open and the press slows down, stops, reverses direction, stops at a predetermined location, again reverses direction so as to travel in the same direction and at the same speed as the belt, and the press again closes into said pressing position, said
   wherein the motions of said components as between each other and with respect to the groups of dough balls discharged onto said conveyor belt causes the press platens to press successive adjacent groups of dough units being conveyed on said belt.

8. The apparatus described in claim 7 including means for removing debris from both sides of said conveyor belt along its return run.

9. The apparatus described in claim 7 including means extending along the edges of at least one of said platens which provide abutments that prevent the opposing surfaces of said platens from coming closer to each other during the closed, pressing operation than predetermined adjustable distances throughout.

10. The apparatus described in claim 8 including means extending along the edges of at least one of said platens which provide abutments that prevent the opposing surfaces of said platens from coming closer to each other during the closed, pressing operation than predetermined adjustable distances throughout.

* * * * *